Aug. 7, 1923.

J. W. BOBB

AUTOMOBILE SPRING

Filed Oct. 3, 1922

1,464,238

Inventor
John W. Bobb

By [signature]

Attorney

Patented Aug. 7, 1923.

1,464,238

UNITED STATES PATENT OFFICE.

JOHN W. BOBB, OF HILLSBORO, OHIO.

AUTOMOBILE SPRING.

Application filed October 3, 1922. Serial No. 592,114.

*To all whom it may concern:*

Be it known that I, JOHN W. BOBB, a citizen of the United States, residing at Hillsboro, in the county of Highland, State of Ohio, have invented certain new and useful Improvements in Automobile Springs; and I do hereby declare the following to be a full, clear, and exact description of the invention, such as will enable others skilled in the art to which it appertains to make and use the same.

This invention relates to new and useful improvements in springs and particularly to the front springs of automobiles.

One object of the invention is to provide a front vehicle spring device which may be readily applied to an automobile, and particularly to a Ford automobile, without modification to the construction of the automobile.

Another object is to provide a spring device of this character by means of which the regular front spring will be forced to act under strain being applied at either end of the front axle.

Other objects and advantages will be apparent from the following description when taken in connection with the accompanying drawing.

Figure 1:
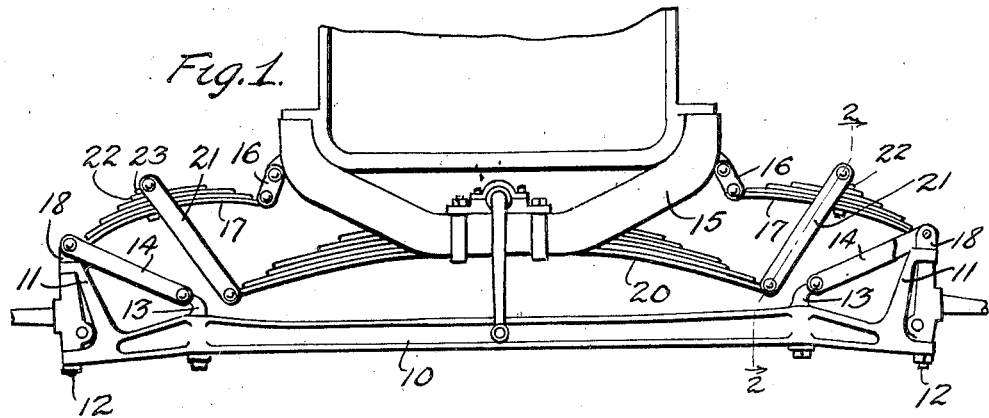
Figure 1 is a front elevation of a portion of an automobile showing the application of the present invention.
Figure 2:
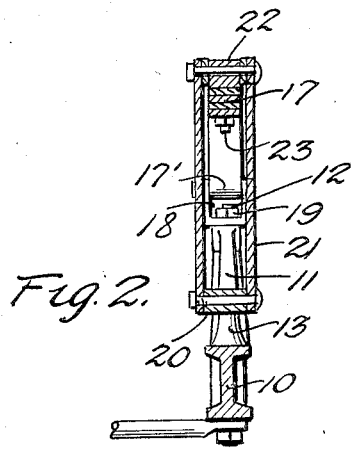
Figure 2 is a vertical central sectional view on the line 2—2 of Figure 1.

Referring particularly to the accompanying drawing 10 represents the front axle of an automobile which has the steering knuckle yokes at its ends, as shown at 11, for the reception of the spindle bolts 12. Carried by the axle 10, inwardly of the yokes 11, are the eyes 13, to which the shackles of the front spring are ordinarily connected. In the present instance, these shackles are removed from the eyes, as will be more clearly explained later herein. Connected to each of the eyes 13, and to the upper ends of the spindle bolts 12, are the braces 14. These braces serve to protect the upper arms of the yokes 11 against great strain as will be apparent as the description proceeds. Connected to the ends of the front cross member 15, of the chassis of the automobile, are the shackles 16, and connected to the ends of these shackles are the ends of the short laminated springs 17. The outer ends of the springs 17 have their eyes 17' connected with the U-shaped members 18 which are secured on the upper ends of the spindle bolts 12, by means of the usual nuts 19. It will be readily seen that the braces 14 serve to prevent undue strain on the upper arms of the yokes 11, applied by the springs 17. The regular front spring 20 has its ends connected with the links 21, which are pivotally connected with the eye members 22 secured to the intermediate portions of the springs 17 by the bolts 23.

When upward pressure is applied to the end of the front axle the outer end of the spring 17, at that end of the axle, will move upwardly causing the inner end to bear downwardly on the frame and body of the automobile, with the result that the links 21 will exert an upward pull on the adjacent end of the main spring 20. Thus the main spring is more properly brought into action, and the jar or shock easily absorbed.

From the foregoing it will be seen that the invention is readily capable of application to an automobile, by simply rearranging certain of the parts forming the regular equipment of the automobile, thus obviating the necessity for changing the construction, or the sizes or shapes of the parts of either the axle or the main spring.

What is claimed is:

1. The combination with an axle of an automobile having spindle bolts in the ends thereof and frame, of a main semi-elliptic spring clipped intermediate its ends to the frame and with its ends spaced above the axle, auxiliary semi-elliptic springs connected at their ends to the frame and to the ends of the said axle links connected to the ends of the main spring and to the intermediate portions of the second-named semi-elliptic springs, and links connected to the said spindle bolts and to the ends of the axle at the points of connection of the auxiliary springs therewith.

2. The combination with an axle and the frame of an automobile, of a main semi-elliptic spring disposed longitudinally over the axle, springs connected to the frame and to the ends of the axle, connections between the ends of the main spring and the intermediate portions of the second-named springs, and braces extending between the points of connection of the first springs with the axle, and the axle.

In testimony whereof, I affix my signature, in the presence of two witnesses.

JOHN W. BOBB.

Witnesses:
 Mac W. Spargur,
 Maude Spargur.